(12) United States Patent
Fish et al.

(10) Patent No.: US 6,652,800 B2
(45) Date of Patent: Nov. 25, 2003

(54) METHOD FOR PRODUCING FIBERS

(75) Inventors: Jeffrey E. Fish, Dacula, GA (US); Jark C. Lau, Roswell, GA (US); Bryan D. Haynes, Cumming, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 312 days.

(21) Appl. No.: 09/803,812

(22) Filed: Mar. 12, 2001

(65) Prior Publication Data
US 2001/0014358 A1 Aug. 16, 2001

Related U.S. Application Data

(62) Division of application No. 09/001,645, filed on Dec. 31, 1997, now Pat. No. 6,200,120.

(51) Int. Cl.[7] .................. D01D 5/098; D01D 5/14; D01D 13/00
(52) U.S. Cl. ............... 264/555; 264/210.8; 264/211.14
(58) Field of Search ................. 264/210.8, 211.14, 264/555

(56) References Cited

U.S. PATENT DOCUMENTS

| | | | |
|---|---|---|---|
| 3,057,009 A | 10/1962 | Lipski | |
| 3,268,084 A | 8/1966 | Allman et al. | |
| 3,615,995 A | 10/1971 | Buntin et al. | |
| 3,684,415 A | 8/1972 | Buntin et al. | |
| 3,825,379 A | 7/1974 | Lohkamp et al. | |
| 3,954,361 A | 5/1976 | Page | |
| 4,167,548 A | 9/1979 | Arduini et al. | |
| 4,663,220 A | 5/1987 | Wisneski et al. | |
| 4,818,464 A | 4/1989 | Lau | |
| 5,017,112 A | 5/1991 | Mende et al. | |
| 5,160,746 A | 11/1992 | Dodge, II et al. | |
| 5,171,512 A | 12/1992 | Mende et al. | |
| 5,279,776 A | 1/1994 | Shah | |
| 5,476,616 A | 12/1995 | Schwarz | |

FOREIGN PATENT DOCUMENTS

| | | |
|---|---|---|
| DE | 2823472 A1 | 12/1978 |
| FR | 2146932 A | 3/1973 |

OTHER PUBLICATIONS

PCT Search Report, PCT Application No. PCT/US98/271819, dated May 21, 1999.

*Primary Examiner*—Leo B. Tentoni
(74) *Attorney, Agent, or Firm*—Dority & Manning, P.A.

(57) ABSTRACT

A method for producing fibers from a molten thermoplastic material includes the steps of extruding the molten thermoplastic material from a material outlet having a longitudinal axis and producing a stream of pressurized fluid that exists a fluid tube removably securable to a die head assembly and including an outlet coaxial with the material outlet longitudinal axis and extending at least into the material outlet. The method may be carried out using various material outlet and fluid tube configurations.

23 Claims, 7 Drawing Sheets

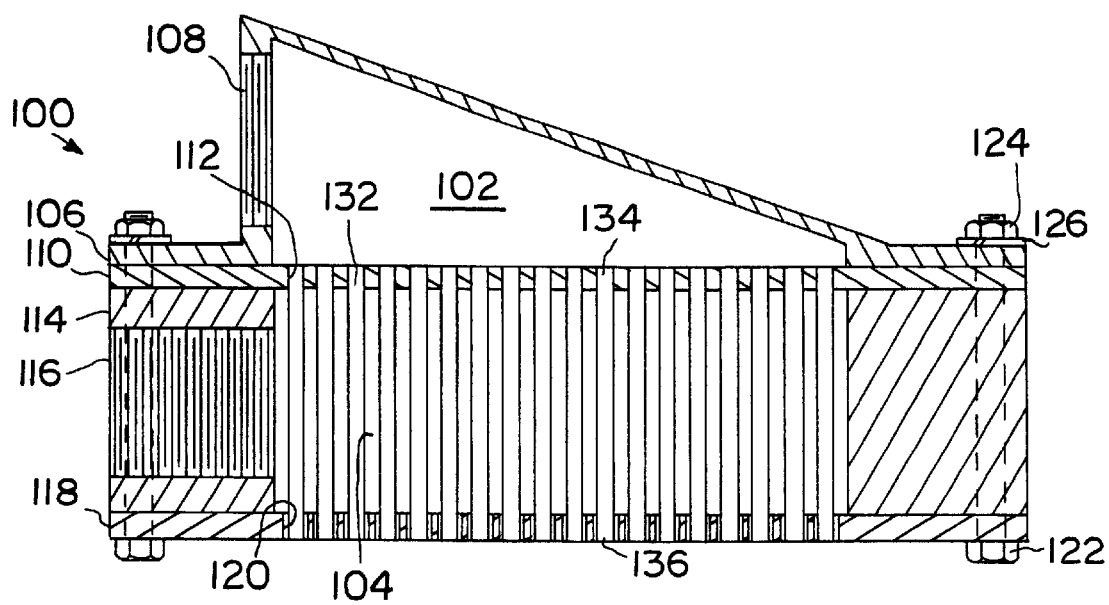
FIG. 5
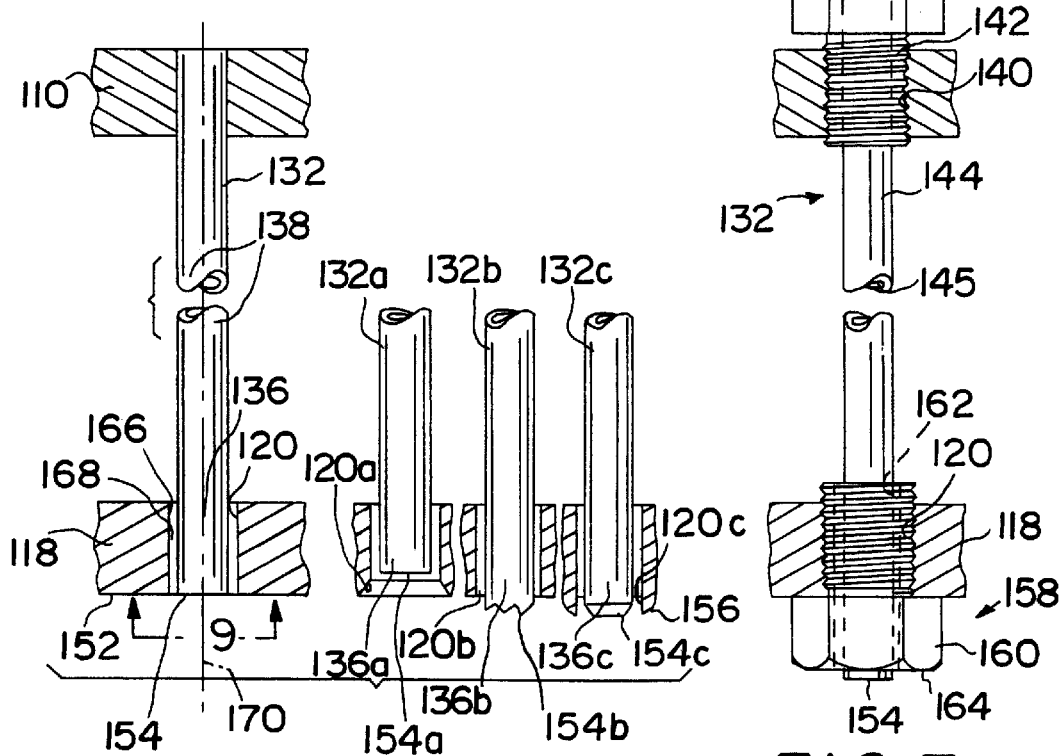
FIG. 6
FIG. 7

METHOD FOR PRODUCING FIBERS

CROSS REFERENCE TO RELATED APPLICATION

This application is a divisional based on U.S. patent application Ser. No. 09/001,645, filed Dec. 31, 1997, issued as U.S. Pat. No. 6,200,120.

BACKGROUND OF THE INVENTION

The present invention relates to an improved die head assembly, apparatus, and process for meltblowing a thermoplastic polymer to form a fiber and a nonwoven fabric web, and more particularly relates to an improved die head assembly, apparatus, and process for meltblowing a fiber-forming thermoplastic polymer using an air flow through a removably securable passageway that is centrally-located within an extruded polymer flow, or using an extruded polymer flow through an elongated opening, to form meltblown fibers and a nonwoven fabric web.

Meltblowing techniques for forming very small diameter fibers, sometimes referred to as microfibers or meltblown fibers, from thermoplastic resins and polymers are well-known in the art. For example, the production of fibers by meltblowing is described in an article entitled "Superfine Thermoplastic Fibers", appearing in *Industrial and Engineering Chemistry, Vol.* 48, No. 8, pp. 1342–1346. This article describes work done at the Naval Research Laboratories in Washington, D.C. Another publication dealing with meltblowing is *Naval Research Laboratory Report* 111437, dated Apr. 15, 1954. Generally, meltblowing techniques include heating a thermoplastic fiber-forming resin to a molten state and extruding the molten resin from a die arrangement having a plurality of linearly arranged small diameter capillaries as molten threads. The molten threads exit the die into a high velocity stream of gas, usually air, which is maintained at an elevated temperature, and which serves to attenuate the threads of molten resin to form fibers having a diameter which is less than the diameter of the capillaries of the die arrangement.

A typical apparatus and process for forming a meltblown fabric is shown in FIG. 1, in which a hopper 10 provides polymer material to an extruder 12 attached to a die 14 which extends across the width 16 of a nonwoven web 18 to be formed by the meltblowing process. Inlets 20 and 22 provide pressurized gas to die 14. FIG. 2 shows a partial cross-section of a portion of die 14, including an extrusion slot 24 that receives polymer from extruder 12 and chambers 26 and 28 that receive pressurized gas from inlets 20 and 22. Chambers 26 and 28 are defined by base portion 30 and plates 32 and 34 of die 14.

The melted polymer is forced out of slot 24 through a plurality of small diameter capillaries 36 extending across tip 38 of die 14. Capillaries 36 have a diameter on the order of 0.0145 to 0.0180 in., and are spaced from 9–30 capillaries per inch. The gas passes from chambers 26 and 28 through passageways 40 and 42. The two streams of gas from passageways 40 and 42 converge to entrain and attenuate molten polymer threads 44 (see FIG. 1) as they exit capillaries 36 and land on a foraminous surface 46, such as a belt. The molten material is extruded through capillaries 36 at a rate of from 0.02 to 1.7 grams/capillary/minute at a pressure of up to 300 p.s.i.g. The temperature of the extruded molten material is dependent on the melting point of the material chosen, and is often in the range of 125 to 335° C. The gas may be heated to 100 to 400° C. and pressurized up to 20 p.s.i.g.

The extruded threads 44 form a coherent, i.e. cohesive, fibrous nonwoven web 18 that may be removed by rollers 47, which may be designed to press web 18 together to improve the integrity of web 18. Thereafter, web 18 may be transported by conventional arrangement to a wind-up roll, pattern-embossed, etc. U.S. Pat. No. 4,663,220 discloses in greater detail an apparatus and process using the above-described elements, and is incorporated by reference herein.

U.S. Pat. No. 4,818,464, the disclosure which is also incorporated by reference herein, discloses a process and apparatus for meltblowing thermoplastic material using a different type of die head. In this patent, a centrally located gas jet passes through or between an opening or openings for extruding thermoplastic material. FIG. 3 shows a partial sectional view of a die tip as taught in U.S. Pat. No. 4,818,464. As shown, gas inlet 48 and extrusion openings 50 and 52 are arranged such that the longitudinal axes 54 and 56 of openings 50 and 52 are disposed at an angle with longitudinal axis 58 of inlet 48 of about 30 degrees to less than about 90 degrees, and typically about 60 degrees. (See angles 60 and 62).

While the above devices work well for their intended purposes, they are subject to a few minor drawbacks. For example, the small diameter capillaries used to deliver molten thermoplastic material in the above devices require very precise machining to properly locate and create the capillaries. Thus, die heads with extremely fine capillaries are expensive to create.

Also, the small diameter capillaries may be clogged if, for example, molten thermoplastic material were to char or degrade prior to reaching the capillary, forming a solid particle too large to fit through the capillary. Further, the addition of pigments and other additives, or the presence of impurities, could similarly cause clogging of capillaries. It is a time-consuming and expensive process to halt production of a meltblowing line, remove the partially clogged die head assembly, install a clean die head assembly, and clean the clogged die head assembly capillaries for future use.

Further, the small diameter capillary may require the molten thermoplastic material to be heated to an extremely high temperature in order to ensure a low enough viscosity to allow for smooth flow through the small diameter capillary. Also, a high pressure must be used to ensure the molten thermoplastic material is properly extruded through the small diameter capillaries at a flow rate high enough to justify commercial production. With the higher pressures and temperatures used, the entire apparatus must be larger and the energy usage must be higher. Alternately, a low molecular weight (high meltflow rate) material may be required to achieve a suitable low viscosity. Such low molecular weight polymers are often more expensive than materials than have not been treated to attain these characteristics.

Moreover, due to the small diameter of the capillaries, it is difficult to give the capillary any shape other than a circle. Thus, the shape of the fibers formed from such a die head assembly are limited to those attainable by extrusion through a circular capillary.

Also, typical commercial die head assemblies include one row of capillaries, rather than a large array of rows of capillaries, because of the need to have intimate contact between the primary air and polymer filaments to properly attenuate the filaments. The prior art does not permit the spacing of multiple rows of capillaries adjacent each other. Thus, commercial production is limited to the amount of polymer that can be extruded from a single row of extremely small capillary openings. In order to make commercial production feasible, high polymer velocity must be achieved through each hole, generally leading to larger fibers and/nor harsher webs, which can be undesirable.

OBJECTS AND SUMMARY OF THE INVENTION

It is a principle object of the present invention to provide a die head assembly, apparatus, and process for meltblowing a thermoplastic polymer, and a meltblown fiber and a nonwoven fabric web that are easy and economical to construct, maintain, and run.

Another object of the present invention is to provide a die head assembly that is easier to clean and is less likely to clog than currently-available products.

Still another object of the present invention is to provide a die head assembly, apparatus, and process for meltblowing a thermoplastic polymer to create a nonwoven fabric web having a greater throughput and production rate than currently-available devices and processes.

Yet another object of the present invention is to provide a die head assembly, apparatus, and process using an array of openings for meltblowing a thermoplastic polymer.

Another object of the present invention is to provide a die head assembly and apparatus requiring less precision machining than current die head assemblies and apparatuses.

Still another object of the present invention is to provide a die head assembly, apparatus, and process for meltblowing a thermoplastic polymer, and a meltblown fiber and nonwoven fabric web, wherein the meltblown fiber formed has an elongated cross-section.

To achieve these objects, and in accordance with the purposes of the invention, as embodied and broadly described herein, a die head assembly is provided for meltblowing thermoplastic material comprising a first chamber for receiving a pressurized fluid, and a second chamber for receiving a pressurized molten thermoplastic material, the second chamber defining an outlet through which the molten thermoplastic material exits the die head. A fluid tube is removably securable to the first chamber and defining a passageway having an inlet in communication with the first chamber and an outlet extending at least into the outlet of the second chamber.

The fluid tube outer surfaces and the second chamber outer surface may have any of several possible cross-sectional shapes.

Optionally, the outlet of the second chamber defines a longitudinal axis and the outlet of the fluid tube defines a longitudinal axis coaxial with the second chamber outlet longitudinal axis. Also, the outlet of the second chamber optionally defines a longitudinal axis, and the outlet of the second chamber and the outlet of the fluid tube define at least one elongated opening therebetween elongated in a direction extending substantially perpendicular to the longitudinal axis, the molten thermoplastic material passing through the elongated opening as it exits the die head. As many as four or six elongated openings may be provided.

The outlets may be arranged in a single row or in an array including a plurality of rows.

Optionally, the die head assembly may further include a source of supplemental fluid and a conduit in communication with the supplemental fluid source having an outlet near the second chamber outlet.

The fluid tube may be secured to the first chamber via threads or a press fit.

In accordance with another aspect of the invention, a die head assembly is provided for meltblowing thermoplastic material comprising a first chamber for receiving a pressurized fluid, the first chamber having a wall defining a fluid outlet therethrough, and a second chamber secured to the first chamber for receiving a pressurized molten thermoplastic material, the second chamber defining an outlet through which the molten thermoplastic material exits the die head. A fluid tube is removably securable to the first chamber outlet and defining a passageway having an inlet in communication with the first chamber, an outlet extending at least into the outlet of the second chamber, and a center portion extending through the second chamber.

In accordance with another aspect of the invention, an apparatus is provided for forming a nonwoven web comprising a pressurized fluid supply, a pressurized molten thermoplastic material supply, and a die head for creating meltblown fibers from the molten thermoplastic material. The die head includes a first chamber for receiving the pressurized fluid, a second chamber for receiving the molten thermoplastic material, the second chamber defining an outlet through which the molten thermoplastic material exits the die head, and a fluid tube removably securable to the first chamber and defining a passageway having an inlet in communication with the first chamber and an outlet extending at least into the outlet of the second chamber. A driven foraminous surface collects the meltblown fibers to form the nonwoven web.

In accordance with another aspect of the invention, an apparatus is provided for forming a nonwoven web comprising a pressurized fluid supply, a pressurized molten thermoplastic material supply, and a die head for creating meltblown fibers from the molten thermoplastic material. The die head includes a first chamber for receiving the pressurized fluid, a second chamber for receiving the molten thermoplastic material, the second chamber defining an outlet through which the molten thermoplastic material exits the die head, and a passageway having an inlet in communication with the first chamber and an outlet extending at least into the outlet of the second chamber, the passageway defined by a member including an outer surface, one of the second chamber outlet inner surface and the passageway outer surface including a substantially planar portion opposing the other of the passageway outer surface and the second chamber outlet inner surface so as to form at least one opening elongated in a direction perpendicular to the direction of movement of the molten thermoplastic material as it exits the die head. A driven foraminous surface collects the meltblown fibers to form the nonwoven web.

In accordance with another aspect of the invention, a method is provided for producing fibers from a molten thermoplastic material, the method comprising the steps of extruding the molten thermoplastic material from a material outlet having a longitudinal axis, and producing a stream of pressurized fluid that exits a fluid tube removably securable to a die head assembly and including an outlet coaxial with the material outlet longitudinal axis and extending at least into the material outlet.

In accordance with another aspect of the invention, a fiber is provided having an elongated cross-section formed by the process of extruding the molten thermoplastic material from a material outlet having a longitudinal axis, and producing a stream of pressurized fluid that exits a fluid tube removably securable to a die head assembly and including an outlet coaxial with the material outlet longitudinal axis and extending at least into the material outlet.

In accordance with another aspect of the invention, a nonwoven web is formed by the process of extruding the molten thermoplastic material from a material outlet having a longitudinal axis, producing a stream of pressurized fluid that exits a fluid tube removably securable to a die head assembly and including an outlet coaxial with the material outlet longitudinal axis and extending at least into the material outlet, and collecting the extruded molten thermoplastic material on a driven foraminous surface.

In accordance with another aspect of the invention, a meltblown fiber is provided having an elongated cross-section.

Additional objects and advantages of the invention will be set forth in part in the following description, or may be obvious from the description, or may be learned through the practice of the invention.

BRIEF DESCRIPTION OF THE DRAWINGS

The present invention will be more fully understood from the following detailed description, taken in conjunction with the accompanying drawings, wherein like reference numerals refer to like parts, and in which:

FIG. 5 is a cross-sectional view of the die head assembly of FIG. 4;

FIG. 6 is a partial sectional view showing different possible orientations of fluid tubes within the die head assembly of FIG. 4;

FIG. 7 is a partial sectional view showing one way to mount a fluid tube in the die head assembly of FIG. 4;

DETAILED DESCRIPTION OF THE PREFERRED EMBODIMENTS

Figure 1:
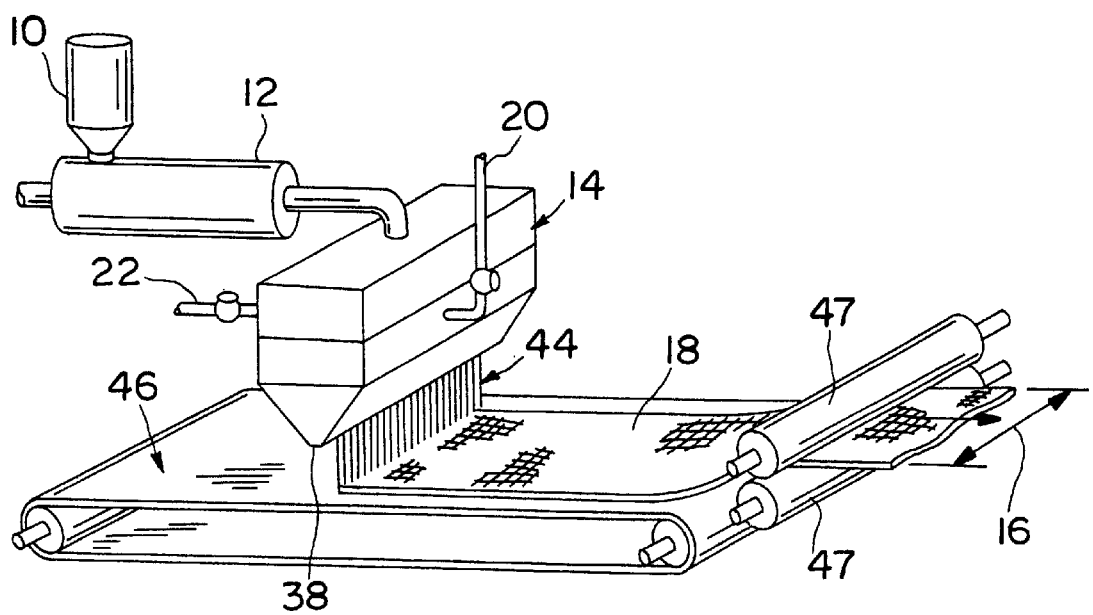
FIG. 1 is an isometric view of a conventional apparatus for making a nonwoven web.

Reference will now be made in detail to the presently preferred embodiments of the invention, one or more examples of which are illustrated in the drawings. Each example is provided by way of explanation of the invention and not meant as a limitation of the invention. For example, features illustrated or described as part of one embodiment or figure can be used on another embodiment or figure to yield yet another embodiment. It is intended that the present invention include such modifications and variations.

In accordance with the present invention, a first embodiment of a die head assembly for meltblowing thermoplastic material is broadly embodied in FIGS. 4–9. As shown, die head assembly 100 includes a first chamber 102 for receiving a pressurized fluid and a second chamber 104 for receiving a pressurized molten thermoplastic material. First chamber 102 is defined by an intake plate 106 including a fluid inlet 108 and a dividing plate 110 defining at least one fluid outlet 112. Second chamber 104 is defined by a material intake plate 114 including a material inlet 116, a base plate 118 defining at least one material outlet 120, and dividing plate 110. Thus, dividing plate 110 forms a common wall of both first chamber 102 and second chamber 104. However, if desired, dividing plate 110 may be formed of two separate plates, one each for first chamber 102 and second chamber 104. Plates 106, 110, 114, and 118 may be joined together by bolts 122, nuts 124, and washers 126, as shown. Preferably, holes 128 are provided through each of plates 106, 110, 114, and 118 for receiving bolts 122, so that die head assembly 100 can be substantially assembled using one set of connectors. If desired, line up pins 130 may be provided through some of holes 128 to ease assembly of plates 106, 110, 114, and 118. Also, seal members such as gaskets, o-rings, etc. (not shown) may be provided between some or all of plates 106, 110, 114, and 118, to improve sealing of pressurized fluid and molten material within first and second chambers 102 and 104.

As shown in FIGS. 4–9, a plurality of fluid tubes 132 is provided, each having an inlet 134 in communication with first chamber 102 and an outlet 136 extending at least into outlet 120 of second chamber 104. Each fluid tube 132 has an outer surface 138 that may have various cross-sectional shapes, as will be described below.

Preferably, fluid tubes 132 are removably securable to first chamber 102. As shown in FIGS. 5 and 6, fluid tubes 132 may be secured to first chamber 102 by a press fit within fluid outlet holes 102. Alternately, fluid tubes 132 may be threaded into first chamber 102. Thus, if desired, as shown in FIG. 7, holes 120 may include an interior thread 140, and fluid tubes 132 may include an exterior thread 142. One way to provide exterior thread 142 is to mount a tube member 144 within a threaded bolt 146 having an internal bore 148. Tube member 144 defines a passageway 145 connecting inlet 134 and outlet 136, and may be secured to threaded bolt 146 via a weld 150. Manufacturing die head assembly 100 with removable fluid tubes 132 allows for easy maintenance and cleaning of the die head assembly, as will be described below.

FIGS. 6 and 7 show various possible orientations of fluid tubes 132 relative to base plate 118 and various possible fluid tube outlet 136 configurations. In each of the embodiments of FIGS. 6 and 7, fluid tube outlets 136 extend at least into second chamber outlets 120, but do so in different ways and with different shapes. For example, outlet 136 of fluid tube 132 in FIG. 6 is flush with the exterior surface 152 of base plate 118, and outlet 136 has a flat and annular edge 154. Outlet 136a of fluid tube 132a in FIG. 7 is recessed into base plate 118, and outlet 136b of fluid tube 132b extends from base plate 118. Outlet 136a has an edge 154a like edge 154, and outlet 136b has an irregular edge 154b. Outlet 136c extends from base plate 118 and includes a bevelled edge 154c. Material outlet 120a diverges outward, and material outlet 120c includes a nozzle 156 extending from base plate 118. Outlets 136 may extend out of or being extracted into openings 120 on the range of about 0.50 in. or less, depending on the processing conditions desired.

As shown in FIG. 7, an adjustable nozzle 158 may be provided in the form of a bolt 160 threaded into material outlet 120. Bolt 160 defines a central passageway 162 through which tube member 144 passes and which serves as the material outlet for second chamber 104. By rotating bolt 160 relative to base plate 118, the relative spacing of edge 154 of tube member 144 and the edge 164 of bolt 160 can be adjusted to change the degree of extension from or retraction into bolt 160 by fluid tube edge 154. The relative spacing can alter the types of fibers produced by die head assembly 100. Also, use of an adjustable and removable nozzle such as bolt 160 makes cleaning die head assembly 100 easier.

Figure 8:
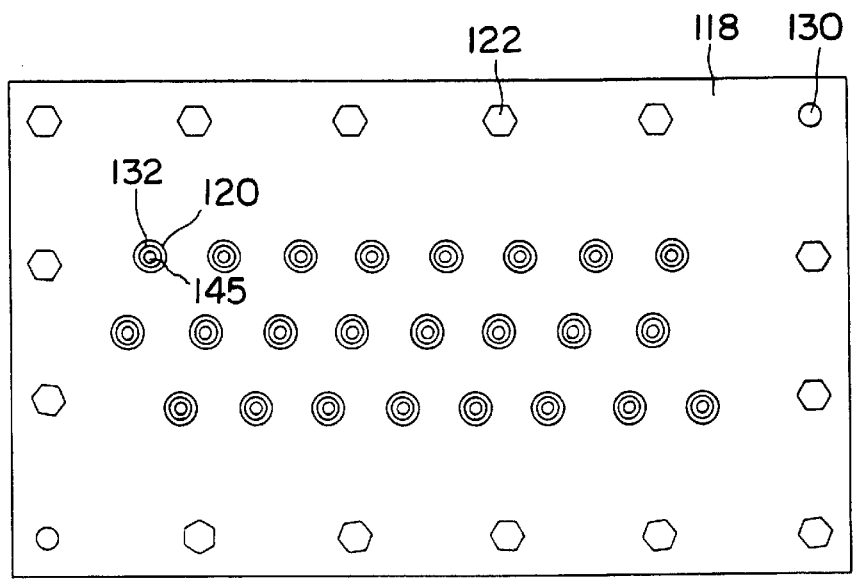
FIG. 8 is a bottom view of the die head assembly of FIG. 4.
Figure 9:
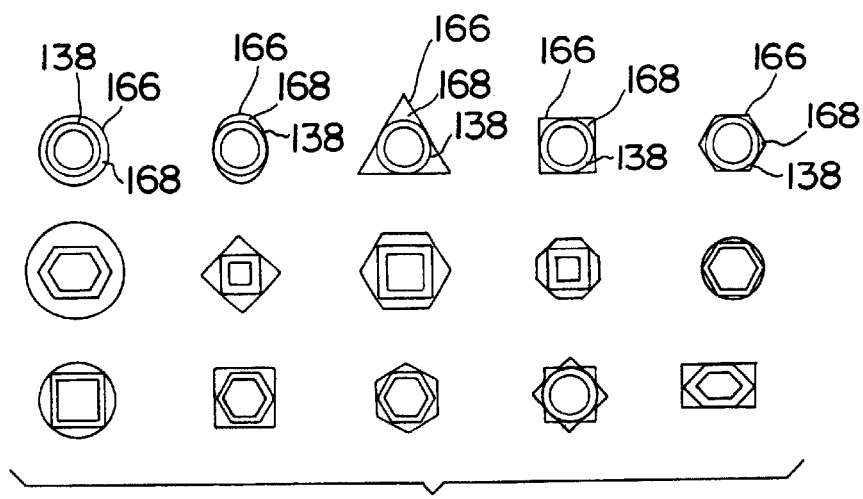
FIG. 9 is a diagram showing various possible configurations of the fluid tube and molten material outlets for use in the die head assembly of FIG. 4.

As shown best in FIGS. 5–8, material outlet holes 120 are larger than outer surface 138 of fluid tubes 132. Thus, the interior surface 166 of material outlet holes 120 and outer surface 138 of fluid tubes 132 form at least one opening 168 (see FIG. 9) therebetween through which the molten thermoplastic material is extruded. Optionally, the opening or openings 168 may be elongated in a direction that extends perpendicular to the longitudinal axis 170 of fluid tube 132 and material outlet 120 (see FIG. 6). An "elongated" opening 168 is one that is longer by at least about 50 percent than it is wide (that is, has an aspect ratio of 1.5 or more), when viewed in a plane perpendicular to longitudinal axis 170. FIG. 9 shows a number of possible configurations of outer surface 138 of fluid tube 132 and inner surface 166 of material outlets 120, many of which provide a number of elongated openings 168 therebetween. The use of elongated and segmented openings allows for production of fibers having elongated or "flat" cross-sections not possible using prior art circular openings.

Material outlet holes 120, if round, may have a diameter of from 0.050 to 0.150 in. or more, which is much larger than prior art capillary sizes (0.0145 to 0.0180 in., for example). If square, rectangular, triangular, etc., outlet holes 120 may have sides of as long as 0.20 or 0.25 in. or more. However, much of the outlet holes 120 are filled by fluid tubes 132, so the molten material does not pass through the entire area of the outlet holes and thus passes between the fluid tubes 132 and the outlet holes 120. Preferably, a plurality of segmented openings 168 is created between each fluid tube 132 and material outlet 120, thus creating the effect of a number of smaller holes but not requiring the precise machining of prior art die heads. A typical spacing between surfaces 138 and 166 is on the order of 0.010 to 0.100 in., which is generally larger than most prior art capillaries. If a material outlet hole 120 or a set of openings 168 becomes clogged, it is a relatively simple matter to remove the respective fluid tube 132 and/or bolt 160 for clearing the clog from the larger hole, as compared to prior art die heads where the entire die head often had to be removed for clearing out clogged smaller capillaries.

FIG. 9 shows various examples of different fluid tube 132 and mateiral outlet 120 surface shapes. It should be understood that these examples are not the only configurations possible. Thus, inner surface 166 of material outlets 120 may be round, oval, triangular, square, rectangular, hexagonal, any other sort of polygonal, or irregularly angularly and curvedly shaped. For ease of machining, circular shapes may be desired for material outlets 120. As an option, plate 118 may be made in two parts per row of outlets 120 with outlets 120 defined between the parts by the interfacing edges of the parts. Such construction would allow for easier machining of noncircular outlet 120 shapes.

The fluid tubes 132 are preferably made of an extruded metal, and thus their shape is limited only by the limitations of the extrusion process. However, fluid tubes could also be drilled for bar stock or manufactured in any other way if so desired. The inner diameter (or dimension if angular) of fluid tubes 132 is in the range of about 0.030 to 0.150 in., depending, of course, on the size of material openings 120.

Figure 16:
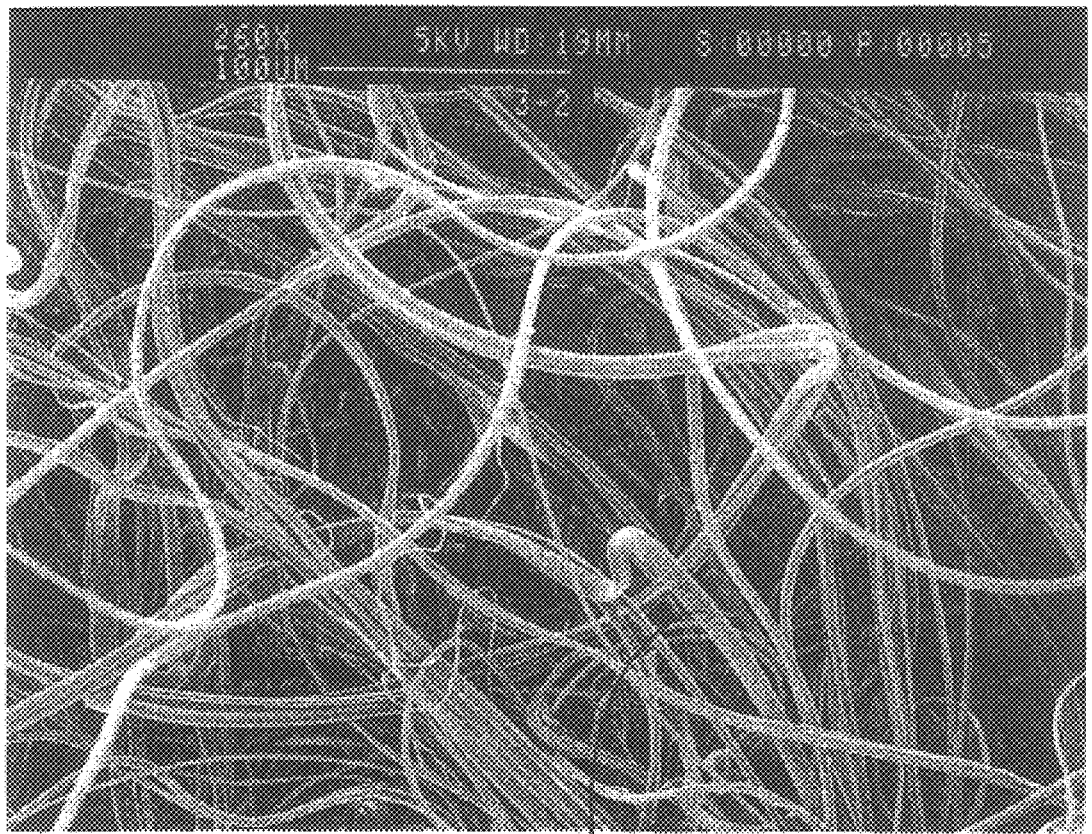
FIG. 16 is a photograph showing an enlarged view of fibers formed according to the present invention.

For formation of flat fibers, a hexagonal-shaped fluid tube 132 within a circular opening 120 is preferred. The molten material is stripped off flat surfaces of tube 132 by the fluid during fiber formation. FIG. 16 shows an example of such a flat fiber "F" formed according to the present invention.

Fluid tubes 132 should form a seal with dividing plate 110 so that molten material does not leak into first chamber 102 and so that the fluid does not leak into second chamber 104. Plates 110 and 118 preferably have a thickness of about 0.250 in. or more depending on the size of the die, so that they securely hold fluid tubes 123 in place and withstand fluid pressures of up to at least 70 p.s.i.g., and molten material pressures of up to 30 p.s.i.g. For safety, a rupture disk (not shown) or some other pressure relief device may be provided on second chamber 104 in case of excessive internal pressure.

The molten material is extruded through a hole of larger diameter than a typical capillary tube. This fact allows for a lowering of the pressure required to properly extrude the molten material to the range of 2 to 20 p.s.i.g. from the prior art range of up to 500 p.s.i.g., thereby providing energy and manufacturing savings due to the reduced scale of certain parts.

Also, the molten material may be able to be extruded at temperatures lower than prior temperatures. The use of lower temperatures beneficially reduces or avoides degradation of polymer during processing. Again, various cost savings result from being able to reduce the temperature of the extruded molten material.

Further, the use of larger material openings 120 allows more molten material to be extruded per linear unit of die head, resulting in a greater throughput rate than for prior art die head assemblies. Moreover, the present invention allows for use of an array of outlets 120, as shown in FIG. 8, rather than a single row of outlets, as in conventional die heads, thereby substantially increasing throughput.

In this regard, applicants believe that it is not necessary for fluid to create suction to draw the molten material out of the die head and attenuate it, as has been previously stated in the art. Rather, the fluid exiting fluid tubes 132 may serve to strip molten material from the sides of the fluid tubes, rather than to draw the molten material out of the tubes. Stated another way, the fluid entrains the molten material once extruded, but does not draw it out of the tubes. Turbulence downstream of the fluid tubes breaks up and distributes the molten material in fiber form to form the web. As will be described below, a source or sources of secondary air to aid in the entrainment process may be provided.

Preferably, the fluid and molten thermoplastic material are heated prior to entry into die head assembly 100 by conventional means. Also, heating units (not shown) may be embedded within portions of die head assembly 100 such as within plate 114 to maintain system temperatures. Any type of commonly-used thermoplastic materials or combinations of materials may be processed with die head assembly 100, such as, but not limited to, polyolefins or elastomers. The fluid used is preferably air or some other gas, although it is possible that a liquid such as water could also be used within the scope of the invention.

The table below lists a number of examples of operating conditions (not necessarily optimized or preferred operating conditions), both for manufacturing fibers according to the present invention and using a typical prior art meltblowing diehead. Polypropylene was the polymer used in all four examples.

|  | Fluid Temp F. | Fluid Pressure psig | Polymer Temp F. | Polymer Pressure psig |
|---|---|---|---|---|
| High Throughput | 680 | 50 | 480 | 2 |
| Low Throughput 1 | 630 | 50 | 460 | 2 |
| Low Throughput 2 | 500 | 60 | 400 | 20 |
| Conventional | 500 | 10 | 460 | 200 |

A high throughput, a first low throughput and a second low throughput example are provided in the table. The high throughput example and the low throughout 1 example utilize a circular opening 120 and a hexagonal tube member 132, where the tube member did not contact the opening. The low throughput 2 example utilizes a circular opening 120 with a hexagonal tube member 132, where the tube member did contact opening 120 at its corners. For the high throughput example, tube member 132 stuck out of outlet 120 about 0.25 in., for the low throughput 2 example, tube member 132 was recessed within outlet 120 about 0.030 in., and for the low throughput 1 example, tube member 132 was flush with outlet 120. The conventional example is for a diehead having a single row of circular capillaries.

Figure 2:
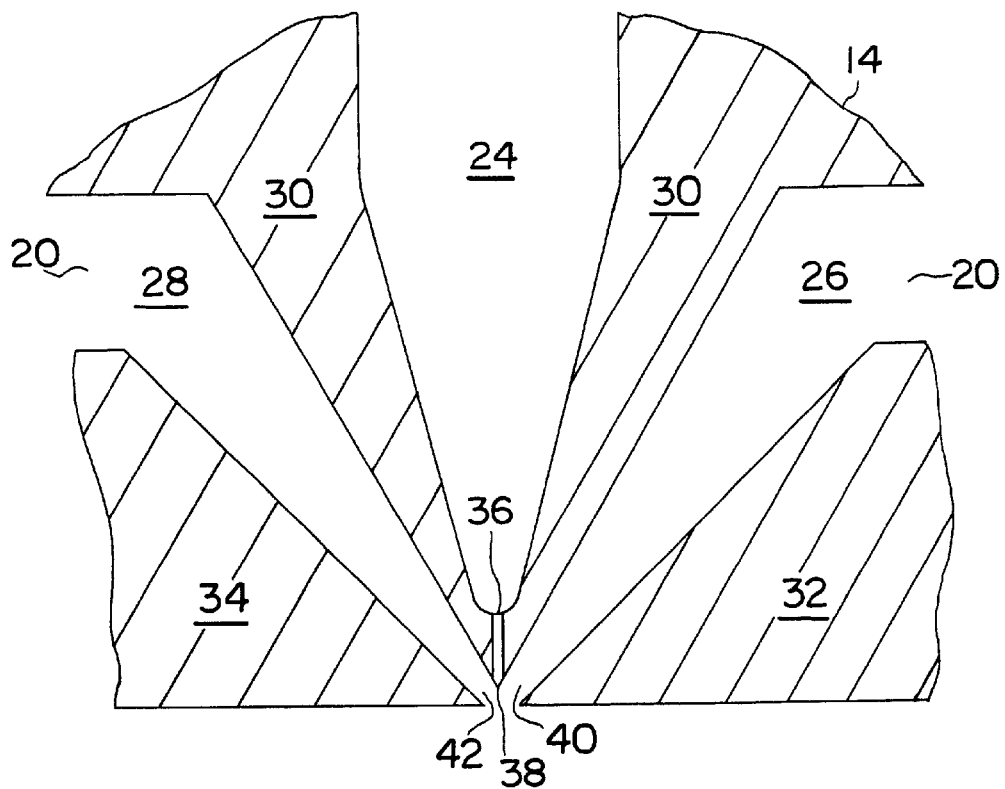
FIG. 2 is a cross-sectional view of the tip of a conventional die head.
Figure 3:
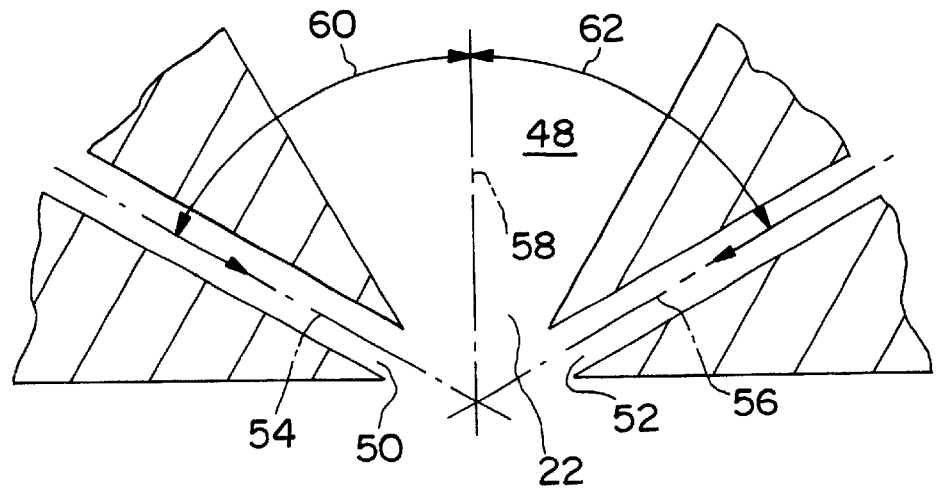
FIG. 3 is a cross-sectional view of the tip of prior art die head.
Figure 4:
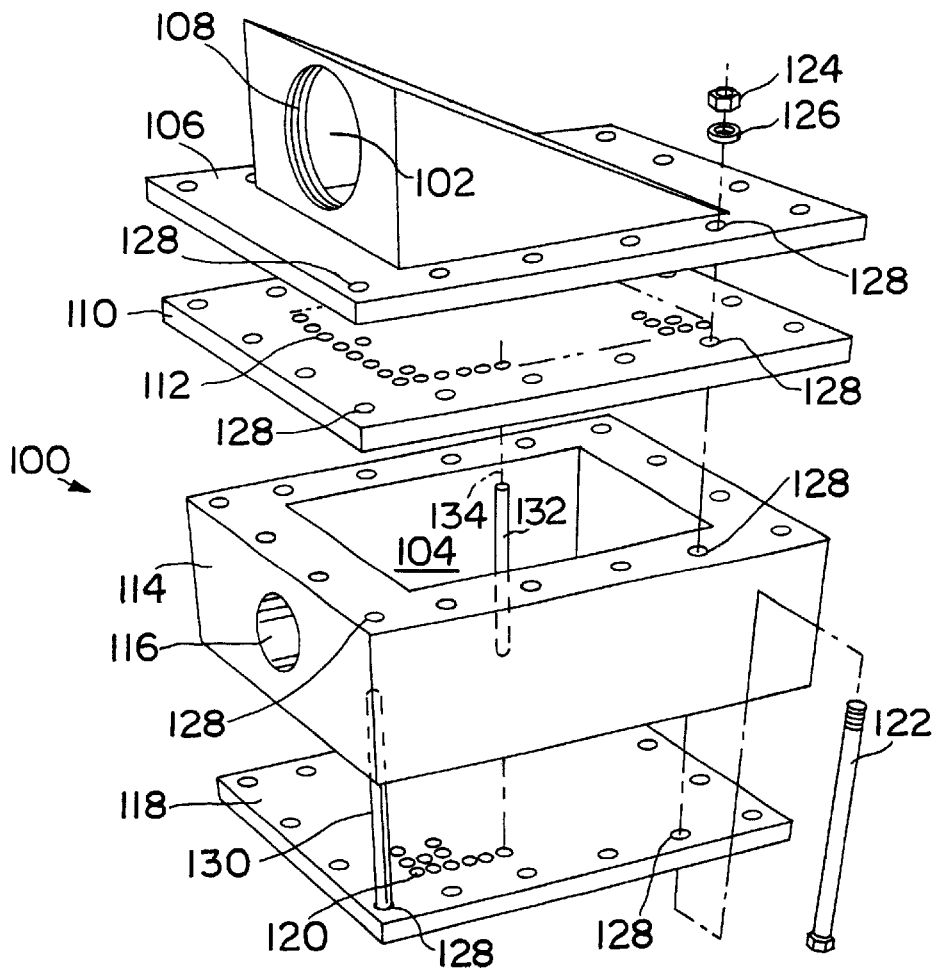
FIG. 4 is an exploded perspective view of one embodiment of a die head assembly according to the present invention.

As indicated, the pressure required to extrude the molten material according to the present invention is much lower than conventional pressures, due to the fact that the holes through which the material is extruded are generally larger in cross section. It is possible that the molten material temperature could be reduced in some situations as compared to conventional processes by use of the present invention. The fluid pressure required by the present invention is greater than that of typical prior art diehead assemblies due to the configuration of the fluid tubes 132 as compared to chambers 26 and 28 (as shown in FIG. 2). However, because the area of fluid outlet is smaller, the total volume of air required is not necessarily higher than for conventional designs. The fluid temperature required with the present invention may be higher than that of the conventional devices.

Figure 10:
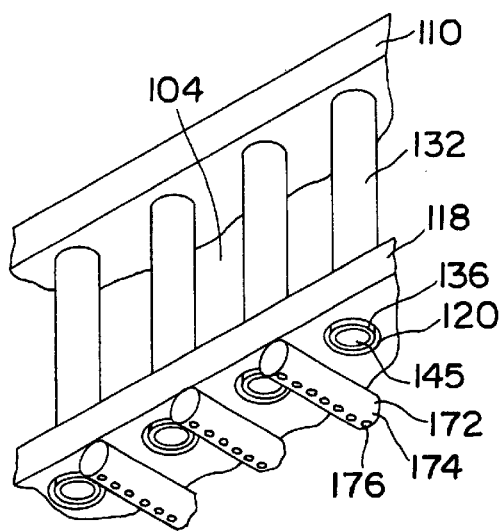
FIG. 10 is a partial perspective view of an alternate embodiment of the die head assembly of FIG. 4 showing one possible arrangement of secondary fluid pipes.
Figure 11:
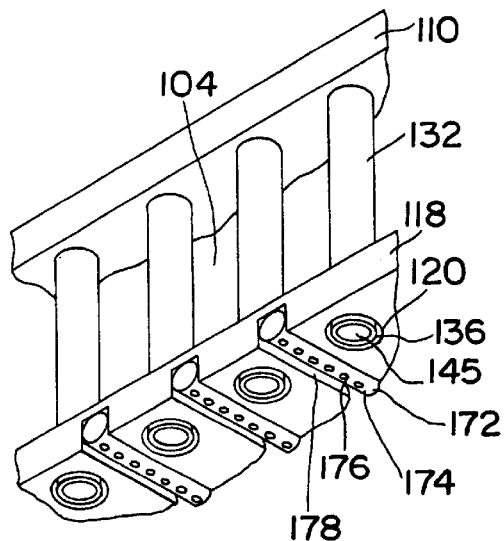
FIG. 11 is a partial perspective view of a variation of the embodiment of FIG. 10 showing a recessed arrangement of secondary fluid pipes.

As an option, in order to ensure proper throughput from a plurality of openings 120, a source of supplemental fluid may be provided to assist in the entrainment of the molten material as it exits outlets 120. The supplemental fluid source may comprise inlets such as inlets 20 and 22, as shown in FIG. 1, for receiving pressurized fluid. As broadly depicted in FIG. 10, a source of supplemental fluid may include a conduit 172 comprising a supplemental fluid pipe 174 extending across base plate 118 adjacent outlets 120. Supplemental fluid pipe 174 includes outlets 176 for providing supplemental fluid to the stream of molten thermoplastic material. Outlets 176 may be holes, slots, or any other shape. As shown in FIG. 11, fluid pipes 174 may optionally be recessed within channels 178 formed in base plate 118. If provided, supplemental fluid may have a pressure in the range of 10 to 40 p.s.i.g. The supplemental fluid may or may not be heated.

Figure 12:
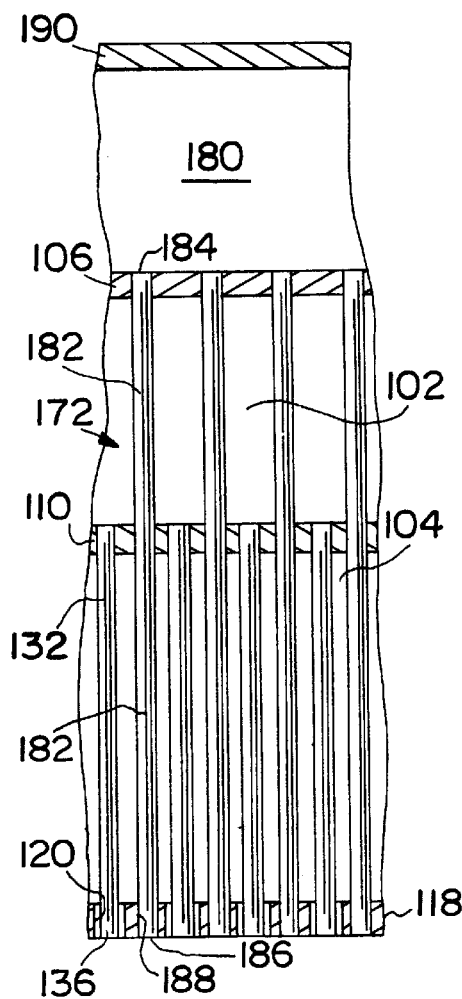
FIG. 12 is a partial sectional view of a second alternate embodiment of the die head assembly of FIG. 4 showing another possible arrangement of secondary fluid tubes.
Figure 13:
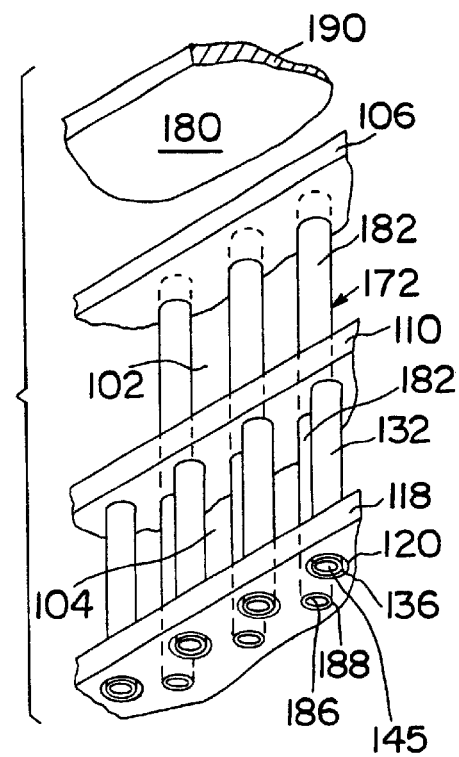
FIG. 13 is a partial perspective view of the embodiment of FIG. 12.

Alternately, as shown in FIGS. 12 and 13, the source of supplemental fluid may include a third chamber 180 defined by wall 190 and disposed adjacent chamber 102. Conduit 172 in this embodiment includes at least one supplemental fluid tube 182 having an inlet 184 in communication with third chamber 180 and an outlet 186 near second chamber outlet 120. As shown in FIG. 13, outlet 186 of supplemental tubes 182 are disposed in holes 188 no larger than outlets 186. Therefore, no molten thermoplastic material passes around supplemental fluid tubes 182, as occurs around primary fluid tubes 132.

Figure 14:
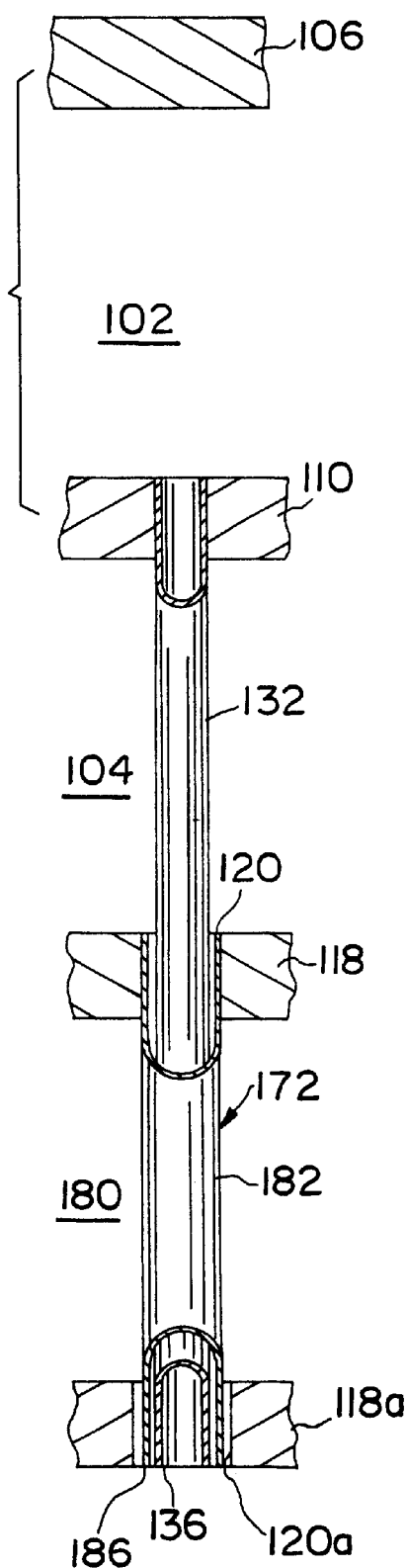
FIG. 14 is a partial sectional view of a third alternate embodiment of the die head assembly of FIG. 4 showing another possible arrangement of secondary fluid tubes.
Figure 15:
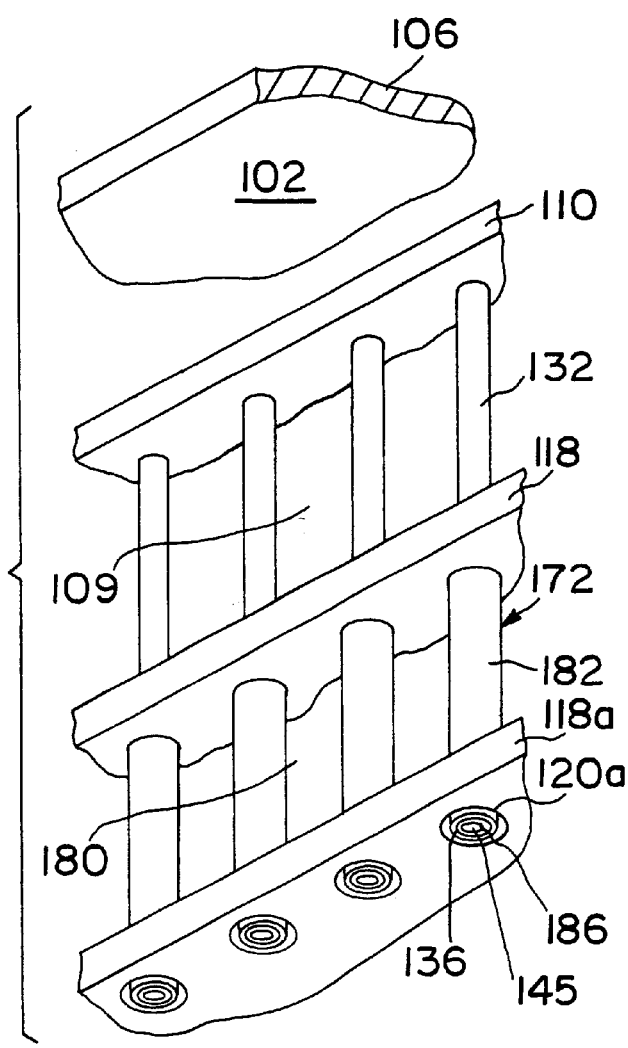
FIG. 15 is a partial perspective view of the embodiment of FIG. 14.

FIGS. 14 and 15 show an alternate arrangement of supplemental fluid tubes 182 (generally, conduits 172) in which third chamber 180 defined by wall 118a is disposed adjacent second chamber 104. Supplemental fluid tube 182 carries molten thermoplastic material through its interior and allows supplemental fluid to pass around its exterior. Thus, the arrangement of FIGS. 14 and 15 provides a central, primary fluid flow, a surrounding molten thermoplastic material flow, and a further surrounding supplemental fluid flow. Thus, outlet 120a must be large enough to accommodate the two coaxially located tubes 132 and 182. Also, the varying cross-sectional arrangements shown in FIG. 9 may be provided between tubes 132 and 182. Therefore, changing the cross sectional shapes of the tubes changes the cross sectional output shape of the molten thermoplastic material.

It will be apparent to those skilled in the art that various modifications and variations can be made in the present invention without departing from the scope and spirit of the invention. It is intended that the present invention include such modifications and variations as come within the scope of the appended claims and their equivalents.

We claim:

1. A method for producing fibers from a molten thermoplastic material, the method comprising the steps of:
   extruding the molten thermoplastic material form a material outlet having a longitudinal axis; and
   producing a stream of pressurized fluid that exits a fluid tube removably securable to a die head assembly and including an outlet coaxial with the material outlet longitudinal axis and extending at least into the material outlet.

2. The method of claim 1 wherein the fluid tube outlet is recessed within the material outlet.

3. The method of claim 1 wherein the fluid tube outlet is flush with the material outlet.

4. The method of claim 1 wherein the fluid tube outlet extends through the material outlet.

5. The method of claim 1 wherein the fluid tube outlet includes a beveled edge.

6. The method of claim 1 wherein the fluid tube outlet has an irregular edge.

7. The method of claim 1 wherein the fluid tube outlet has a flat, annular edge.

8. The method of claim 1 wherein the material outlet flares outward in a downstream direction.

9. The method of claim 1 wherein the material outlet includes a nozzle extending from a base plate in which the material outlet is defined.

10. The method of claim 9 wherein the nozzle is adjustable so that a spacing between the material outlet and the fluid tube outlet may be altered.

11. The method of claim 10 wherein the nozzle includes a treaded member threaded into the base plate.

12. The method of claim 1 wherein the fluid tube is threaded into the die head.

13. The method of claim 1 wherein the fluid tube is press fit into the die head.

14. The method of claim 1 wherein the fluid tube outlet and the material outlet define at least one elongated opening therebetween elongated in a direction extending substantially perpendicular to the longitudinal axis through which the molten thermoplastic material passes.

15. The method of claim 14, wherein at least four of the elongated openings are defined between the fluid tube outlet and the material outlet.

16. The method of claim 14, wherein at least six of the elongated openings are defined between the fluid outlet and the material outlet.

17. The method of claim 1, wherein the molten thermoplastic material is extruded form a plurality of the material outlets and the fluid tubes, each of the fluid tubes extending into a respective material outlet.

18. The method of claim 17, wherein the material outlets are arranged in a single row.

19. The method of claim 17, wherein the material outlets are arranged in an array including a plurality of rows.

20. The method of claim 1, further including the step of producing a stream of supplemental fluid adjacent the material outlet.

21. The method of claim 20, wherein the stream of supplemental fluid passes through a supplemental fluid tube extending through the die head.

22. The method of claim 20, wherein the stream of supplemental fluid passes through a supplemental fluid pipe extending across a base plate in which the material outlet is defined.

23. The method of claim 22, wherein the supplemental fluid pipe is at least partially recessed into the base plate.

* * * * *